Figure 1:
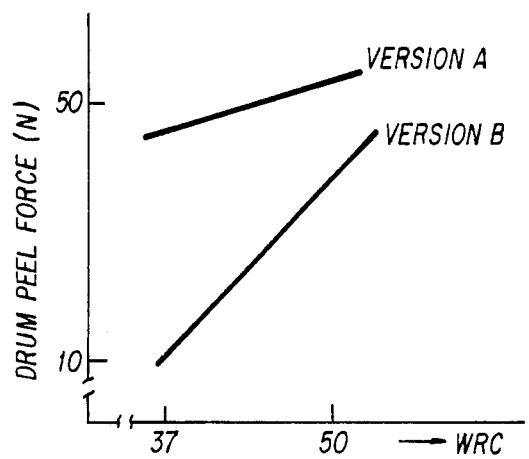

United States Patent [19]

Weinand et al.

[11] Patent Number: 4,569,884
[45] Date of Patent: Feb. 11, 1986

[54] SHEET MATERIAL, PROCESS FOR ITS PRODUCTION AND ITS USE IN THE PRODUCTION OF A COMPOSITE STRUCTURE

[75] Inventors: Guy A. Weinand, Verviers; Jean-Pierre P. A. Botman, Gran-Rechain; Rainer Busch, Raeren, all of Belgium

[73] Assignee: Hexcel Corporation, San Francisco, Calif.

[21] Appl. No.: 419,208

[22] Filed: Sep. 17, 1982

[30] Foreign Application Priority Data

Sep. 18, 1981 [EP] European Pat. Off. ........ 81107427.7

[51] Int. Cl.$^4$ .................. B32B 19/00; B32B 25/00
[52] U.S. Cl. ................................. 428/245; 428/265; 428/272; 428/284; 428/286; 428/287; 428/290
[58] Field of Search ............... 428/246, 252, 286, 287, 428/272, 273, 290, 116, 496, 250, 477.7, 479.3, 117, 118, 245, 265, 284

[56] References Cited

U.S. PATENT DOCUMENTS

| | | | |
|---|---|---|---|
| 3,637,459 | 1/1972 | Parish et al. | 428/116 |
| 3,817,808 | 6/1974 | Ronan et al. | 428/116 |
| 3,817,810 | 6/1974 | Ronan et al. | 428/116 |
| 4,020,209 | 4/1977 | Yuan | 428/272 |
| 4,061,812 | 12/1977 | Gilwee, Jr. et al. | 428/117 |
| 4,082,521 | 4/1978 | McGarvey | 428/246 |
| 4,091,160 | 5/1978 | Koss | 428/116 |
| 4,249,976 | 2/1981 | Hudson | 428/116 |
| 4,263,361 | 4/1981 | Hodes et al. | 428/252 |
| 4,264,671 | 4/1981 | Gillern et al. | 428/251 |
| 4,362,778 | 12/1982 | Andersson et al. | 428/313.5 |

Primary Examiner—George F. Lesmes
Assistant Examiner—William M. Atkinson
Attorney, Agent, or Firm—Lawrence Edelman

[57] ABSTRACT

A sheet material useful for preparing high strength composite structures, especially in the field of light weight construction material, comprises a layer (A) of a high strength fibrous material impregnated and/or coated with a curable synthetic resin in the B-stage and a layer (B) of a polyamide polymer or another polymer having similar properties and being compatible with the curable synthetic resin of layer (A), which layer (B) is partially or completely bound to or embedded in layer (A).

5 Claims, 1 Drawing Figure

COMPOSITE STRUCTURE WITH (A) AND
WITHOUT (B) POLYAMID LAYER

COMPOSITE STRUCTURE WITH (A) AND
WITHOUT (B) POLYAMID LAYER

SHEET MATERIAL, PROCESS FOR ITS PRODUCTION AND ITS USE IN THE PRODUCTION OF A COMPOSITE STRUCTURE

Synthetic resins and high strength fibers are widely used in the preparation of light weight structure in conjunction with metallic or non-metallic core materials.

Most generally sandwich panels are prepared with a honeycomb core and two skin layers, which are laminates made each of one or several layers of high strength fabric impregnated or coated with B-stage resin, such as a resin of epoxy, polyester, phenolic or other type.

Although the intrinsic strength of the laminate alone is rather high, the mechanical properties of the resulting composite structure depend on the quality of bonding between the core material and the applied skin. For light weight composite structures which are to be used in transporting equipments, especially in the construction of aircraft, several distinct properties are required besides good bonding strength, such as fire resistance and low smoke emission and extremely low emission of toxic gases in case of fire.

There are known composite materials comprising a honeycomb core made from an aromatic polyamide-impregnated paper and skin layers consisting of epoxy-based prepregs, which do not cause problems concerning the bonding strength, those materials however are prohibited as parts of the aircraft interior, because they emit smoke and toxic gases in case of fire.

It is therefore highly desirable to use honeycomb core materials and prepreg materials, which satisfy the strict regulations for transporting equipment, especially aircraft equipment.

On the other hand phenolic resin based prepregs are known to provide structures with fairly good general fire resistance, in particular low smoke emission and extremely low amount of toxic gases under fire conditions. For those reasons phenolic resins are good candidates for the manufacture of such sandwichs for aircraft interiors. Unfortunately the bonding strength of laminates made of phenolic resin based prepregs against honeycomb cores as described above, is much below the level that is required. The most common procedure used to overcome this difficulty is to use a high resin content in the prepreg, which tends to increase moderately the bonding strength. The unfortunate consequence is however an increase of the specific weight of the structure and a decrease of the other mechanical properties due to the lower specific amount of reinforcing fibers in the structure.

A severe problem still to be solved is therefore to provide high strength composite structures comprising a porous core material and a skin material bonded thereto, which show increased bonding strength between the core and the skin material, while having a low resin content compared with similar prior materials.

According to the invention this problem may be solved by providing a sheet material, comprising a layer (A) of a high strength fibrous material impregnated and/or coated with a durable synthetic resin in the B-stage and a layer (B) of a polyamide polymer or another polymer having similar properties and being compatible with the curable synthetic resin of layer (A), which layer (B) is partially or completely bound to or embedded in layer (A).

The invention further encompasses a process for producing a sheet material, in which layer (B) in the form of a web is laid down on layer (A) and the two layers are bonded using pressure and/or heat, whereby at least partial transfer of the B stage impregnating resin of layer (A) around the filaments of layer (B) is achieved.

According to another preferred embodiment for producing the sheet material the layer (B) is applied as a film of the polymer, whereby the film is partially dissolved in the curable synthetic resin Layer (A) during the bounding of the two layers by means of pressure and/or heat.

According to a further embodiment layer (B) is applied on the surface of layer (A) in the form of a viscous liquid film consisting of the molten polymer or a solution of the polymer in a solvent.

A further object of the invention is the use of the above-defined sheet material comprising layers (A) and (B) in the production of a composite structure, which comprises a core material, which may be either a honeycomb base or a porous base layer, and further comprises a laminate of preimpregnated or coated webs as an adjacent layer to the core material, in which the sheet material is orientated in such a manner that the polymer layer (B) is on the side of the core material.

In the production of such a composite structure it may be useful to produce a sandwich panel, in which the core material, such as the honeycomb core is sandwiched between two laminated skins, which each consist of the above-defined sheet material. Also in such case the polymer layer (B) is on the side of the core material.

The material of layer (A) may be a usual prepreg used as a construction material in the field of transporting equipment and aircraft equipment. The fibrous material may consist of any kind of mineral fibers, preferably fiber glass, or of fibers of refractory oxides and other refractory materials, carbon fibers, whiskers, natural fibers, such as cellulose fibers, or fibers of synthetic organic resins, such as polyamide or polyester fibers or copolymer fibers. The fibrous material may be in the form of a non-woven sheet, such as a random fiber mat, a woven tissue or in the form of single fibers or filaments oriented in one direction in the form of a layer (unidirectionally laid filaments). This fibrous material is impregnated and/or coated with a curable synthetic resin in the B-stage, which may be any known B-stage-resin, which usually is known for forming prepregs, such as a phenolic resin (preferably in the resitol-stage), a polyester resin, polyimide resin, epoxy resin or a combination of such resins.

Layer (B) which according to the invention is essential to improve the bonding strength between the sheet material and a core material which is to be laminated with the sheet material, is a continuous layer of a polymer which may be applied in the form of a film or a web, such as a woven web. According to a preferred embodiment the polymer layer (B) has the form of a woven web with openings of a size from 0.1 to 3 mm.

The polymer used in this layer in order to improve the bonding strength preferably is a polyamide and can be any of the usual polyamides available in the market. The most preferred material is nylon-66 (polyhexamethylene-adipamide). Basically all known polyamides are useful, including homopolyamides and copolyamides. Further useful are resins having similar properties concerning melt viscosity and melting point, such as polyurethanes. Regarding only the bonding strength also polyesters could be used, the latter however are insatisfactory concerning the other requirements in the aircraft field, such as behaviour in case of fire.

The sheet material according to the invention may be bonded to any usual core material which per se is known as a construction material in the aircraft field. Useful core materials are porous sheets (e.g. of foamed synthetic resin material) or honeycomb material consisting of synthetic resins, such as polyamide resins. The honeycomb material may also be made of metal such as aluminum, or of other materials, such as resin-impregnated paper. In case the core material is a porous foamed resin, it preferably consists of polyurethane foam.

According to an especially preferred embodiment of the invention the core material consists of a polyamide resin and further layer (B) of the sheet materials also is made of a polyamide.

The invention is explained in more detail by the following examples.

In the examples the term prepreg is used in the sense of LN 065 090 (Luftfahrtnorm) for a glass fiber web impregnated with a curable resin in the B-stage.

The testing of the materials was carried out according to LN (Luftfahrtnorm) or according to DAN-Specification (Deutsche Airbus Norm).

In the examples there are used the following technical terms and abbreviations for the consitituents of the sheet material or the laminate respectively:

1. Fabric Style 120 is a glass fabric for aircraft industry (Ref.: LN9169 WL No. 8.4544.6) with the following characteristics:
Weight: 107 gr/m$^2$
Thickness: 0.10 mm
Thread count/cm: 24×23
Tensile strength: 22 21 DaN/cm
Yarn: EC511Z×2S EC511Z×2S Tex 2. Fabric Style 7781 is a glass fabric for aircraft industry (Ref.: LN9169 WL No. 8.4568.6) with the following characteristics:
Weight: 300 gr/cm$^2$
Thickness: 0.25 mm
Thread count/cm: 23×21
Tensile strength: 63 61 DaN/cm
Yarn: EC 6 68Z EC 6 68Z Tex 3. Core material HRH 10—⅛—1.8 is a Nomex ® paper honeycomb for aircraft industry (Ref.: LN 29967, 29968, 29969, 29670) with the following characteristics:
HRH ® 10 refers to the type of material
⅛ is the cell size in fractions of an inch
⅛ is the nominal density in pounds per cubic foot Nomex ® denotes registered DuPont Trademark
HRH ® denotes registered Hexcel Trademark The general procedure used in the examples was as follows:

A sheet material was produced by combining a layer of phenolic prepreg (phenolic resin impregnated glass fiber cloth) with a layer of polyamide-fabric. Between two sheets of the obtained sheet material a Nomex-core material was sandwiched in such a manner that the polyamide layers contacted the core material. The composite structure assembly was as follows:
two layers of phenolic prepreg
one layer of polyamide-fabric
Nomex-core
one layer of polyamide-fabric
two layers of phenolic prepreg The above composite structure assembly according to the invention is designated as "version A".

For comparative purpose a composite struction assembly (version B) was prepared by combining the following layers:
one layer of phenolic prepreg
Nomex-core
one layer of phenolic prepreg By the combination according to version A in the climbing drumpeel-test (according to DAN 406) a more than 200 percent higher strength was obtained than in the case of a combination in which the two polyamide layers were omitted (version B).

Further the use of the polyamide layers resulted in an increase of the acceptable shear tension by 100 percent. The measurement and determination of the toxic gases and smoke density on non-metallic materials proved that the requirements of ATS 1000.001 (Airbus Industry Technical Specification) are fully met by the obtained material. A comparison of the drumpeel-test-data of version A and version B according to Example 1 is given in the attached FIG. 1.

EXAMPLE 1

In the above described manner the following layers were combined, in version A (according to the invention) however between the prepreg layer and the core material a polyamide-layer was included on both sides of the core material.

In the following table the layers used are listed and further the results of the tests according to Deutsche Airbus Norm (DAN 406) are summarized.

| D A N 1000.1 | Version A | Version B |
|---|---|---|
| Glass Fabric Style | 120 | 120 |
| Prepreg Layers | 2 top/bottom | 2 top/bottom |
| WRC (Wet Resin Content) | 37% | 37% |
| Core Material | HRH10⅛-1.8 | HRH10⅛-1.8 |
| Results on Drum Peel (N/75 mm) | 56 | <20 |
| Flex. Load to Failure (N) | 330 | 280 |
| Flatwise Tensile (N/mm$^2$) | 1* | 1* |

*Core Failure

EXAMPLE 2

The example was carried out in the same manner as Example 1.

In the following table layers of the composite structure and the obtained test results are listed.

| D A N 1000.2 | Version A | Version B |
|---|---|---|
| Glass Fabric Style | 120 | 120 |
| Prepreg Layers | 2 top/bottom | 2 top/bottom |
| WRC | 50% | 50% |
| Core Material | HRH10⅛-1.8 | HRH10⅛-1.8 |
| Results in Drum Peel (N/75 mm) | 64 | 25 |
| Flex. Load to Failure (N) | 330 | 260 |
| Flatwise Tensile (N/mm$^2$) | 1* | 1* |

*Core Failure

EXAMPLE 3

The example was carried out in the same manner as Examples 1 and 2.

In the following table the layers of the composite structure and the obtained test results are listed.

| D A N 1003.1 | Version A | Version B |
|---|---|---|
| Glass Fabric Style | 7781 | 7781 |
| Prepreg Layers | 2 top/bottom | 2 top/bottom |
| WRC | 37% | 37% |
| Core Material | | |
| Results in Drum Peel (N/75 mm) | 110 | 66 |
| Flex. Load to Failure (N) | 620 | 590 |
| Flatwise Tensile (N/mm$^2$) | 1* | 1* |

*Core Failure

EXAMPLE 4

The example was carried out in the same manner as Examples 1 and 2.

In the following table the layers of the composite structure and the obtained test results are listed.

| D A N 1003.2 | Version A | Version B |
|---|---|---|
| Glass Fabric Style | 7781 | 7781 |
| Prepreg layers | 2 top/bottom | 2 top/bottom |
| WRC | 50% | 50% |
| Core Material | HRH10½-1.8 | HRH10½-1.8 |
| Results in Drum Peel (N/75 mm) | 130 | 100 |
| Flex. Load to Failure (N) | 700 | 680 |
| Flatwise Tensile (N/mm$^2$) | 1* | 1* |

*Core Failure

EXAMPLE 5

Higher drum peel and flexibility results have been found with a different configuration of the composite structure, which comprised the following layers in the stated order:

one layer of glass fiber, Fabric Style 120, WRC 43% (prepreg layer)

one layer of Fabric Style 7781, WRC 37% (prepreg layer)

Polyamide Fabric Nylon 6.6-20 g/m$^2$

Core-HRH10-⅛-1.8

Polyamide Carrier Nylon 6.6-20 g/m$^2$ one layer of glass fiber, Fabric Style 120, WRC 43% (prepreg layer)

one layer of glass fiber, Fabric Style 120, WRC 43%

Test Results:

Drum Peel (N/75 mm) $F_{D.P.} = 157$

Flex. Load at Failure (N) $F_{FL.} = 623$

Flatwise Tensile (N/mm$^2$) $C_{FT.} = 1$*
*Core Failure

All materials of the above-described examples fully met the requirements of Airbus Industry Technical Specification concerning the amount of toxic gases emitted in case of file and smoke density.

We claim:

1. A sheet material suitable for use with nonmetallic honeycomb core in the construction of honeycomb sandwich panels the sheet material consisting essentially of a layer (A) of a high strength fibrous material impregnated and/or coated with a B-stage phenolic resin, to which one side of the sheet material has been applied a layer (B) of a polyamide resin, said layer (B) of polyamide at least partially imbedded in the preimpregnated phenolic layer (A).

2. The sheet material of claim 1 wherein the fibrous material of layer (A) is a woven web, random fiber mat, or a layer made of unidirectionally laid filaments, the fibrous material consisting of mineral fibers, fibers of synthetic organics resin and/or natural fibers.

3. The sheet material of claim 1 wherein the fibrous material is glass.

4. The sheet material of claim 3 wherein the phenolic resi is of the resol type.

5. The sheet material according to claim 3 wherein the polyamide is nylon 6.6.

* * * * *